United States Patent
Li et al.

(10) Patent No.: US 9,206,807 B2
(45) Date of Patent: Dec. 8, 2015

(54) PRELOAD DISK SPRING, ASSEMBLY STRUCTURE THEREOF, AND FAN USING SAME

(75) Inventors: Yingliang Li, Shenzhen (CN); Qi Ai, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 639 days.

(21) Appl. No.: 13/604,977

(22) Filed: Sep. 6, 2012

(65) Prior Publication Data

US 2014/0064944 A1  Mar. 6, 2014

(51) Int. Cl.
| | |
|---|---|
| *F04D 25/06* | (2006.01) |
| *F04D 29/051* | (2006.01) |
| *F16F 1/32* | (2006.01) |

(52) U.S. Cl.
CPC ............ *F04D 25/062* (2013.01); *F04D 29/051* (2013.01); *F16F 1/324* (2013.01)

(58) Field of Classification Search
CPC ..... F04D 29/051; F04D 29/059; F04D 29/05; F04D 25/062; F16F 1/324; F16F 1/00; F16F 1/025; F16F 1/34; F16F 1/3732; F16F 1/376; F16F 7/00; F16F 15/04; F16F 15/1215; F16C 25/083

See application file for complete search history.

(56) References Cited

U.S. PATENT DOCUMENTS

| | | | | |
|---|---|---|---|---|
| 3,796,124 | A | * | 3/1974 | Crosa ............................. 411/521 |
| 4,364,615 | A | * | 12/1982 | Euler ............................. 384/517 |
| 5,964,536 | A | * | 10/1999 | Kinoshita ..................... 384/441 |
| 6,600,632 | B1 | * | 7/2003 | Prochazka et al. ......... 360/264.1 |
| D703,034 | S | * | 4/2014 | Stewart .......................... D8/399 |

FOREIGN PATENT DOCUMENTS

| | | | | |
|---|---|---|---|---|
| DE | 19843226 | A1 | * | 3/2000 ............. H02K 5/173 |
| DE | 19961709 | A1 | * | 7/2001 ............. F16C 35/06 |
| DE | 102006056319 | | * | 6/2007 |
| WO | WO 2009071240 | A2 | * | 6/2009 |

* cited by examiner

*Primary Examiner* — Edward Look
*Assistant Examiner* — Juan G Flores
(74) *Attorney, Agent, or Firm* — C. G. Mersereau; Nikolai & Mersereau, P.A.

(57) ABSTRACT

A preload disk spring assembly structure for applying a preload to a bearing includes a first and a second main body correspondingly connected to each other face to face. The first main body is provided with at least one first retainer, at least one first notch, and at least one first protruded portion. Similarly, the second main body is provided with at least one second retainer, at least one second notch, and at least one second protruded portion. When the first and the second main body are aligned with each other such that the first retainer is tightly engaged with the second notch, the first notch is tightly engaged with the second retainer and the first protruded portion correspondingly contacts with the second protruded portion, the first and the second main body are brought to assemble together and form an integral body.

19 Claims, 7 Drawing Sheets

PRELOAD DISK SPRING, ASSEMBLY STRUCTURE THEREOF, AND FAN USING SAME

FIELD OF THE INVENTION

The present invention relates to a preload disk spring, and more particularly to a preload disk spring assembly structure and a fan using such preload disk spring assembly structure.

BACKGROUND OF THE INVENTION

A conventional preload disk spring assembly includes two pieces of preload disk springs that are positioned face to face and then fitted around a rotary shaft of a rotor to locate between while press against a bear and a retaining ring on the rotary shaft, so as to apply a preload to the bearing to achieve the purpose of preventing the bearing from vibrating and reducing the noise produced by the vibrating bearing.

While the two pieces of preload disk springs for the conventional preload disk spring assembly are positioned face to face, they are not connected together to form an integral body. When being extended through by the rotary shaft to fit around the rotary shaft, the two preload disk springs would inconsistently rotate about the rotary shaft and/or axially vibrate to become biased from their original positions. Further, the conventional preload disk springs are not axially pressed against the bearing, so that the spring force is not evenly acted on the bearing and the preload applied to the bearing is not parallel to the axial direction of the rotary shaft. As a result, the bearing will still vibrate and produce noise.

Moreover, the conventional preload disk spring assembly will interfere with the assembling of the retaining ring to the rotary shaft, so that the retaining ring could not be accurately retained to the rotary shaft to result in undesirable separation of the rotor from a stator assembly.

SUMMARY OF THE INVENTION

A primary object of the present invention is to provide a preload disk spring, which includes at least one retainer, at least one notch, and at least one protruded portion.

Another object of the present invention is to provide a preload disk spring assembly structure that is assembled from two preload disk springs, which have increased contact areas between them and extended elements in a one-to-one correspondence with one another, so that the preload of the preload disk springs can uniformly distribute in an axial direction of the preload disk spring assembly structure.

A further object of the present invention is to provide a preload disk spring assembly structure that includes two preload disk springs assembled into an integral body, and can therefore eliminate the problem of biased preload disk springs after the assembly structure is assembled to a rotary shaft.

A still further object of the present invention is to provide a preload disk spring assembly structure that is not easily stuck to an annular retaining groove provided on a rotary shaft.

A still further object of the present invention is to provide a preload disk spring assembly structure that allows easy inspection to determine whether the preload disk spring assembly has been correctly located after it is assembled to a rotary shaft.

To achieve the above and other objects, the preload disk spring according to a preferred embodiment of the present invention includes a main body having a radially inner side defining an opening axially extended through the main body, a radially outer side, a first contact surface defined between the inner side and the outer side, at least one retainer projected from the first contact surface and at least one notch located offset from the at least one retainer; a plurality of extended elements formed on the inner side of the main body to radially extend toward a center of the opening; and at least one protruded portion formed on and radially projected from the inner side of the main body toward the center of the opening and having a second contact surface.

To achieve the above and other objects, the preload disk spring assembly structure according to a preferred embodiment of the present invention includes a first main body having a radially first inner side defining a first opening axially extended through the first main body, a radially first outer side, a first contact surface defined between the first inner side and the first outer side, at least one first retainer projected from the first contact surface, and at least one first notch located offset from the at least one first retainer; a plurality of first extended elements formed on the first inner side of the first main body to radially extend toward a center of the first opening; at least one first protruded portion formed on and radially projected from the first inner side of the first main body toward the center of the first opening and having a second contact surface; a second main body having a radially second inner side defining a second opening axially extended through the second main body, a radially second outer side, a third contact surface defined between the second inner side and the second outer side to correspondingly contact with the first contact surface, at least one second retainer projected from the third contact surface to tightly engage with the at least one first notch, and at least one second notch located offset from the at least one second retainer to tightly engage with the at least one first retainer; a plurality of second extended elements formed on the second inner side of the second main body to radially extend toward a center of the second opening; and at least one second protruded portion formed on and radially projected from the second inner side of the second main body toward the center of the second opening, and having a fourth contact surface to correspondingly contact with the second contact surface; whereby the first main body and the second main body are assembled together to form an integral body.

The present invention also provides a fan that employs the above-described preload disk spring assembly structure. The fan of the present invention includes a base having a bearing cup axially forward projected therefrom for receiving at least one bearing therein, and the bearing each having a shaft hole; a stator assembly externally fitted around the bearing cup; a rotor configured corresponding to the stator assembly and having a shaft extended through the bearing via the shaft hole thereof and provided with an annular retaining groove for engaging with a retaining element; and a preload disk spring assembly structure fitted around the shaft of the rotor to locate between the bearing and the retaining element. The preload disk spring assembly includes a first main body having a radially first inner side defining a first opening axially extended through the first main body, a radially first outer side, a first contact surface defined between the first inner side and the first outer side, at least one first retainer projected from the first contact surface, and at least one first notch located offset from the at least one first retainer; a plurality of first extended elements formed on the first inner side of the first main body to radially extend toward a center of the first opening; at least one first protruded portion formed on and radially projected from the first inner side of the first main body toward the center of the first opening and having a second contact surface; a second main body having a radially second inner side defining a second opening axially extended through the second main body, a radially second outer side, a third contact surface defined between the second inner side and the second outer side to correspondingly contact with the first contact surface, at least one second retainer projected from the third contact surface to tightly engage with the at least one first notch, and at least one second notch located offset from the at least one second retainer to tightly engage with the at least one first retainer; a plurality of second extended elements formed on the second inner side of the second main body to radially extend toward a center of the second opening; and at least one second protruded portion formed on and radially projected from the second inner side of the second main body toward the center of the second opening and having a fourth contact surface to correspondingly contact with the second contact surface; whereby the first main body and the second main body are assembled together to form an integral body. Wherein, the shaft is axially extended through the first opening and the second opening, so that the first and the second main body are fitted around the shaft with the first extended elements contacted with and pressed against the bearing and the second extended elements contacted with and pressed against the retaining element.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and with reference to the accompanying drawings.

Figure 1A:
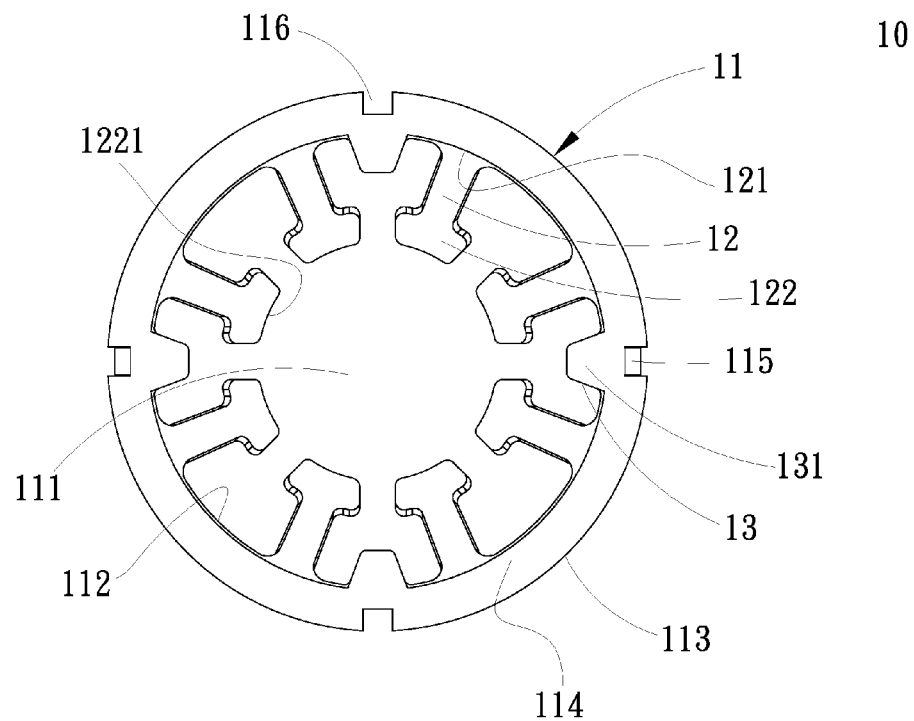
FIG. 1A is a top view of a preload disk spring according to a preferred embodiment of the present invention.
Figure 1B:
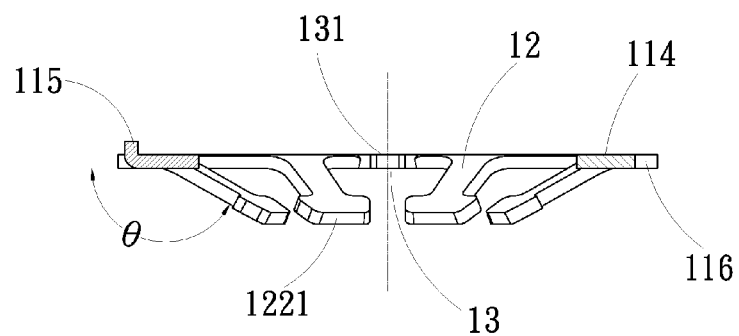
FIG. 1B is a partially sectional side view of FIG. 1A.

Please refer to FIGS. 1A and 1B. A preload disk spring 10 according to a preferred embodiment of the present invention includes a main body 11, a plurality of extended elements 12, and at least one protruded portion 13.

The main body 11 has a radially inner side 112, which defines an opening 111 axially extended through the main body 11, so that the main body 11 is in the form of an annular member; a radially outer side 113, which defines an outer periphery of the main body 11; and a first contact surface 114 defined between the outer side 113 and the inner side 112.

At least one retainer 115 and at least one notch 116 are spaced on or near the outer side 113. The retainer 115 is preferably projected from the first contact surface 114. The notch 116 is located offset from the retainer 115 and is radially recessed from the outer side 113. While two retainers 115 and two notches 116 are shown in the illustrated preferred embodiment, it is understood the number of the retainers 115 and of the notches 116 are not necessarily limited to two. Further, in the illustrated preferred embodiment, the retainers 115 and the notches 116 are alternately spaced on the outer side 113. However, it is also possible for the two retainers 115 to locate adjacent to while space from one another, so that the two notches 116 are also located adjacent to while spaced from one another. The number of the retainers 115 and of the notches 116 can be increased in the case the main body 11 has a larger diameter.

The extended elements 12 are spaced on the inner side 112 of the main body 11 to radially extend toward a center of the opening 111. Each of the extended elements 12 includes a root 121 connected to and extended from the inner side 112, and a head 122 formed on a distal end of the root 121 and having an end surface 1221. The root 121 is bent in a direction averted from the first contact surface 114, such that an angle $\theta$ larger than 90° is included between the main body 11 and the extended element 12.

The protruded portion 13 is formed on and radially projected from the inner side 112 of the main body 11 toward the center of the opening 111. The protruded portion 13 has a second contact surface 131 and has a length shorter than that of the extended elements 12. In the illustrated non-restrictive preferred embodiment, one protruded portion 13 is provided on the inner side 112 every two extended elements 12. However, it is also possible to form one protruded portion 13 between any two adjacent extended elements 12.

In the non-restrictive preferred embodiment, the retainers 115 and the notches 116 are illustrated as being located on the outer side 113 of the main body 11 to correspond to the protruded portions 13 formed on the inner side 112. In other embodiments, the retainers 115 and the notches 116 can be located on the outer side 113 of the main body 11 without corresponding to the protruded portions 13 formed on the inner side 112.

Figure 2A:
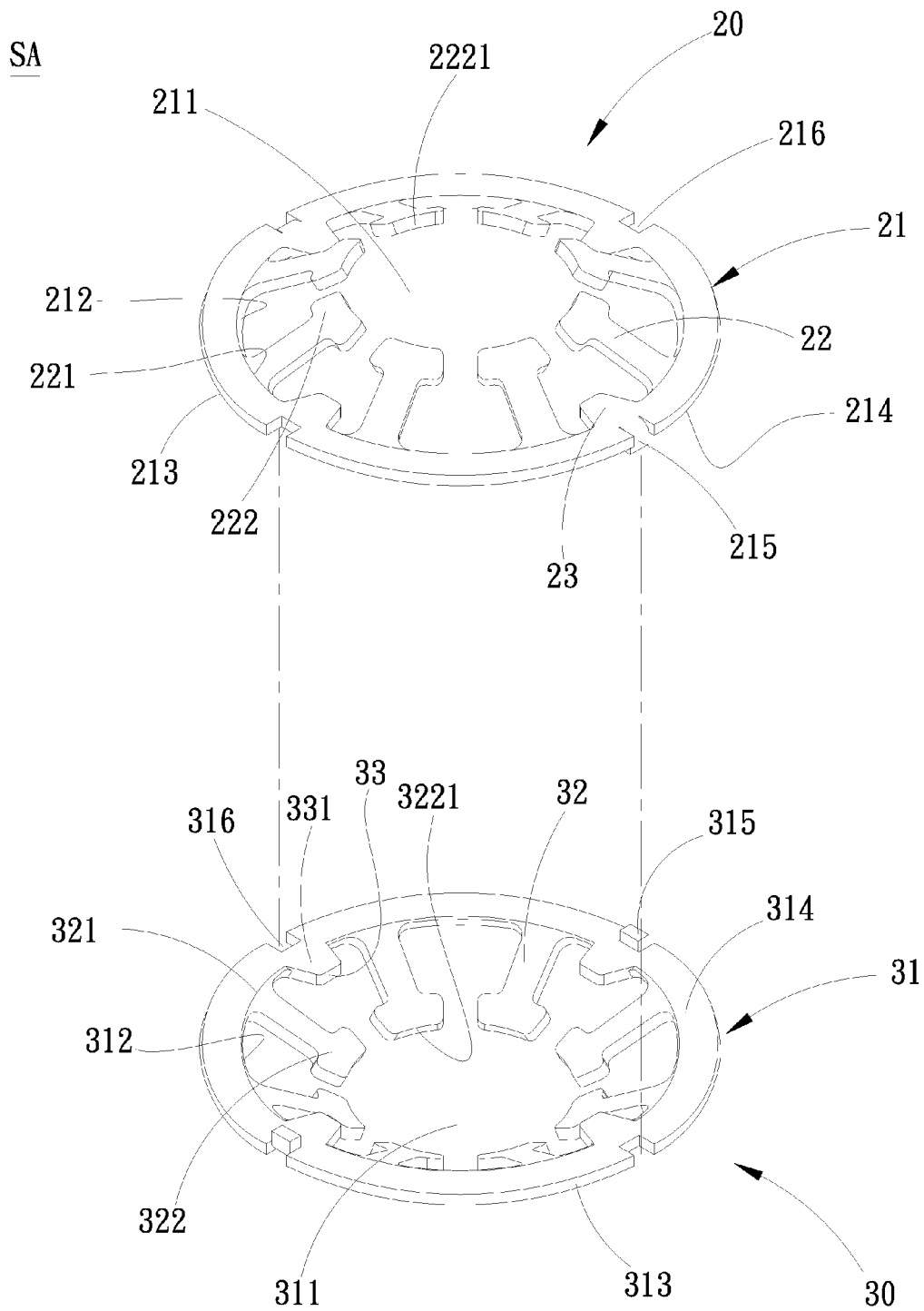
FIG. 2A is an exploded perspective view of a preload disk spring assembly structure according to a preferred embodiment of the present invention.
Figure 2B:
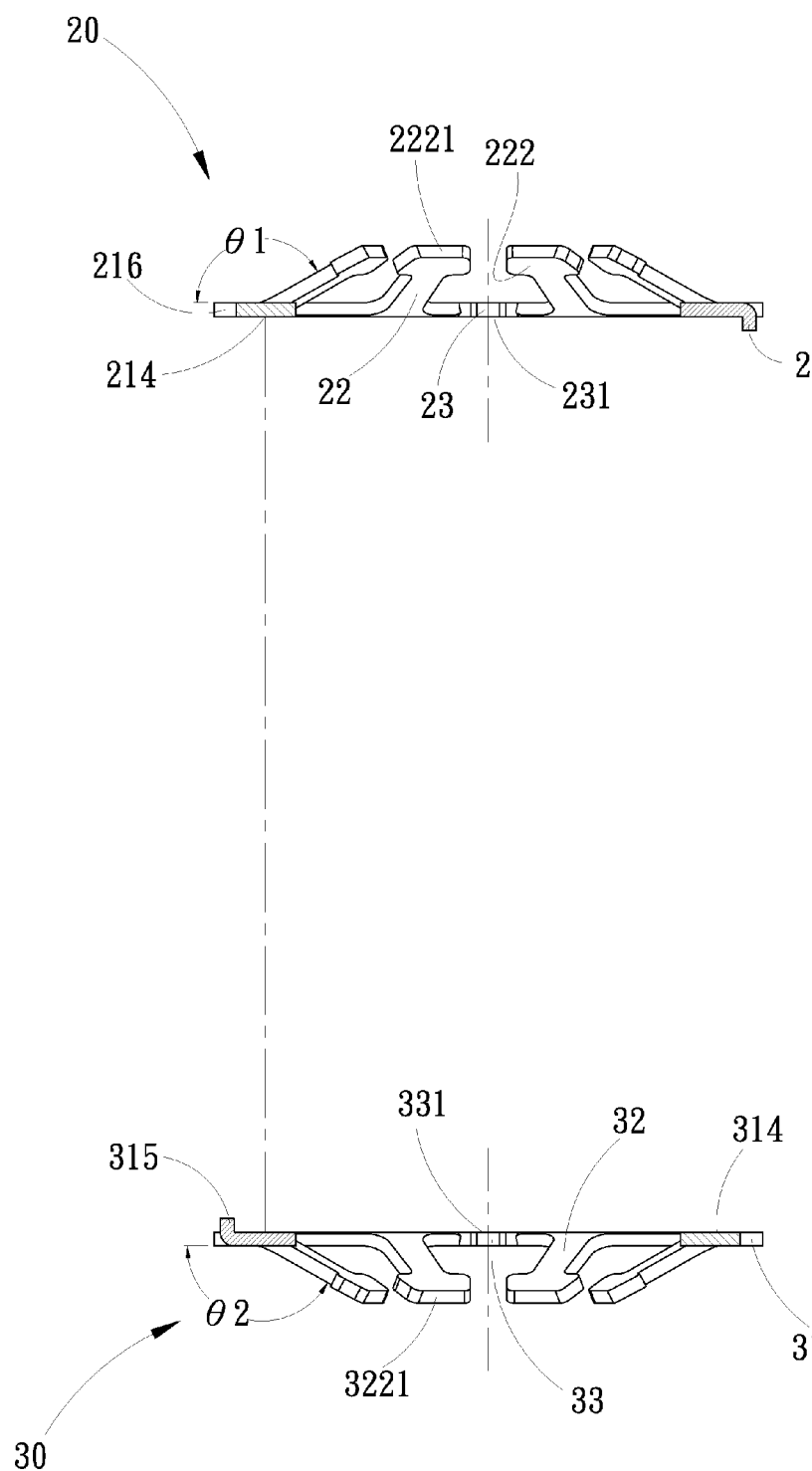
FIG. 2B is a partially sectional side view of FIG. 2A.
Figure 2C:
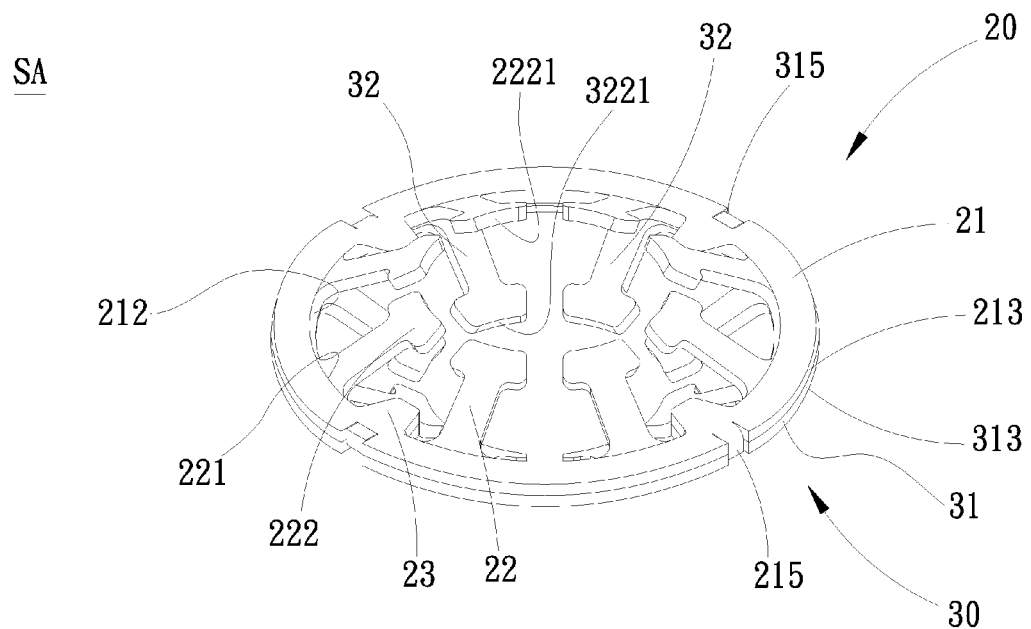
FIG. 2C is an assembled view of FIG. 2A.

FIGS. 2A to 2C illustrate a preload disk spring assembly structure according to a preferred embodiment of the present invention. The preload disk spring assembly structure is generally denoted by "SA" and is formed by assembling two pieces of the preload disk springs 10 described with reference to FIGS. 1A and 1B. To enable clear description of the relation between the two assembled preload disk springs, one of which is herein referred to as the first preload disk spring and denoted by reference numeral 20 while the other one is herein referred to as the second preload disk spring and denoted by reference numeral 30.

As shown in FIGS. 2A and 2B, the first preload disk spring 20 includes a first main body 21, a plurality of first extended elements 22, and at least one first protruded portion 23.

The first main body 21 has a radially first inner side 212, which defines a first opening 211 axially extended through the first main body 21, so that the first main body 21 is in the form of an annular member; a radially first outer side 213, which defines an outer periphery of the first main body 21; and a first contact surface 214 defined between the first outer side 213 and the first inner side 212.

At least one first retainer 215 and at least one first notch 216 are spaced on or near the first outer side 213. The first retainer 215 is projected from the first contact surface 214. The first notch 216 is located offset from the first retainer 215 and is radially recessed from the first outer side 213. While two first retainers 215 and two first notches 216 are shown in the illustrated preferred embodiment, it is understood the number of the first retainers 215 and of the first notches 216 are not necessarily limited to two. Further, in the illustrated preferred embodiment, the first retainers 215 and the first notches 216 are alternately spaced on the first outer side 213. However, it is also possible for the two first retainers 215 to locate adjacent to while space from one another, so that the two first notches 216 are also located adjacent to while spaced from one another. The number of the first retainers 215 and of the first notches 216 can be increased in the case the first main body 21 has a larger diameter.

The first extended elements 22 are spaced on the first inner side 212 of the first main body 21 to radially extend toward a center of the first opening 211. Each of the first extended elements 22 includes a first root 221 connected to and extended from the first inner side 212, and a first head 222 formed on a distal end of the first root 221 and having a first end surface 2221. The first root 221 is bent in a direction averted from the first contact surface 214, such that a first angle θ1 larger than 90° is included between the first main body 21 and the first extended element 22.

The first protruded portion 23 is formed on and radially projected from the first inner side 212 of the first main body 21 toward the center of the first opening 211. The first protruded portion 23 has a second contact surface 231 and has a length shorter than that of the first extended elements 22. In the illustrated non-restrictive preferred embodiment, one first protruded portion 23 is provided on the first inner side 212 every two first extended elements 22. However, it is also possible to form one first protruded portion 23 between any two adjacent first extended elements 22.

In the non-restrictive preferred embodiment, the first retainers 215 and the first notches 216 are illustrated as being located on the first outer side 213 of the first main body 21 to correspond to the first protruded portions 23 formed on the first inner side 212. In other embodiments, the first retainers 215 and the first notches 216 can be located on the first outer side 213 of the first main body 21 without corresponding to the first protruded portions 23 formed on the first inner side 212.

The second preload disk spring 30 includes a second main body 31, a plurality of second extended elements 32, and at least one second protruded portion 33.

The second main body 31 has a radially second inner side 312, which defines a second opening 311 axially extended through the second main body 31, so that the second main body 31 is in the form of an annular member; a radially second outer side 313, which defines an outer periphery of the second main body 31; and a third contact surface 314 defined between the second outer side 313 and the second inner side 312.

At least one second retainer 315 and at least one second notch 316 are spaced on or near the second outer side 313. The second retainer 315 is projected from the third contact surface 314. The second notch 316 is located offset from the second retainer 315 and is radially recessed from the second outer side 313. While two second retainers 315 and two second notches 316 are shown in the illustrated preferred embodiment, it is understood the number of the second retainers 315 and of the second notches 316 are not necessarily limited to two. Further, in the illustrated preferred embodiment, the second retainers 315 and the second notches 316 are alternately spaced on the second outer side 313. However, it is also possible for the two second retainers 315 to locate adjacent to while space from one another, so that the two second notches 316 are also located adjacent to while spaced from one another. The number of the second retainers 315 and of the second notches 316 can be increased in the case the second main body 31 has a larger diameter.

The second extended elements 32 are spaced on the second inner side 312 of the second main body 31 to radially extend toward a center of the second opening 311. Each of the second extended elements 32 includes a second root 321 connected to and extended from the second inner side 312, and a second head 322 formed on a distal end of the second root 321 and having a second end surface 3221. The second root 321 is bent in a direction averted from the third contact surface 314, such that a second angle θ2 larger than 90° is included between the second main body 31 and the second extended element 32.

The second protruded portion 33 is formed on and radially projected from the second inner side 312 of the second main body 31 toward the center of the second opening 311. The second protruded portion 33 has a fourth contact surface 331 and has a length shorter than that of the second extended elements 32. In the illustrated non-restrictive preferred embodiment, one second protruded portion 33 is provided on the second inner side 312 every two second extended elements 32. However, it is also possible to form one second protruded portion 33 between any two adjacent second extended elements 32.

In the non-restrictive preferred embodiment, the second retainers 315 and the second notches 316 are illustrated as being located on the second outer side 313 of the second main body 31 to correspond to the second protruded portions 33 formed on the second inner side 312. In other embodiments, the second retainers 315 and the second notches 316 can be located on the second outer side 313 of the second main body 31 without corresponding to the second protruded portions 33 formed on the second inner side 312.

Figure 2D:
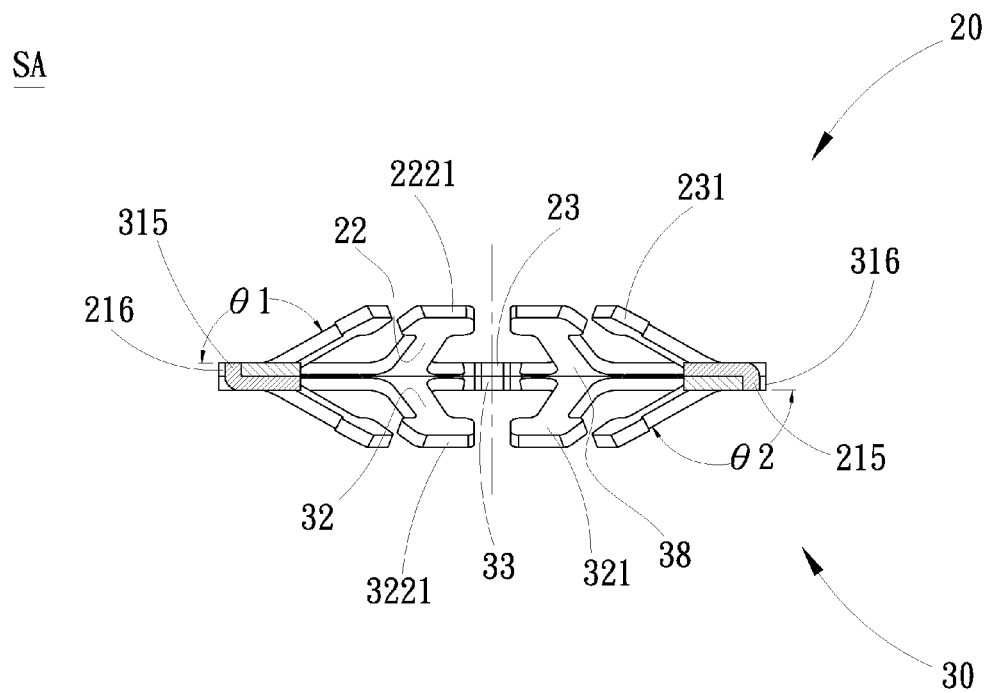
FIG. 2D is a partially sectional side view of FIG. 2C.

Please refer to FIGS. 2A, 2B and 2D. To assemble the first preload disk spring 20 and the second preload disk spring 30 together to form the preload disk spring assembly structure SA according to the present invention, first align the first preload disk spring 20 with the second preload disk spring 30, such that the first contact surface 214 of the first main body 21 and the third contact surface 314 of the second main body 31 contact with each other, the first retainers 215 on the first main body 21 correspond to the second notches 316 on the second main body 31, the first notches 216 on the first main body 21 correspond to the second retainers 315 on the second main body 31, the first protruded portions 23 correspond to the second protruded portions 33, the first opening 211 of the first main body 21 corresponds to the second opening 311 of the second main body 31, and the first extended elements 22 and the second extended elements 32 are located in one-to-one correspondence with one another to thereby define a buffer space 38 between them. The first extended elements 22 and the second extended elements 32 are compressed and shifted toward the buffer space 38 when they are subjected to an external force applied thereto, and can elastically return to their original positions when the externally applied force is removed.

Please refer to FIGS. 2C and 2D at the same time. After aligning the first preload disk spring 20 with the second preload disk spring 30, approach and tightly engage the first retainers 215 to and with the second notches 316 while approach and tightly engage the first notches 216 to and with the second retainers 315. At this point, the first contact surface 214 of the first main body 21 correspondingly contacts with the third contact surface 314 of the second main body 31, the second contact surfaces 231 of the first protruded portions 23 correspondingly contact with the fourth contact surfaces 331 of the second protruded portions 33, and the first main body 21 of the first preload disk spring 20 and the second main body 31 of the second preload disk spring 30 are coupled together to form an integral body.

The preload disk spring assembly structure SA of the present invention has the following advantages: (1) the first preload disk spring 20 and the second preload disk spring 30 contact with each other not only at the first contact surface 214 of the main body 21 and the third contact surface 314 of the second main body 31, but also at the second contact surface 231 of the at least one first protruded portion 23 and the fourth contact surface 331 of the at least one second protruded portion 33, so that the first preload disk spring 20 and the second preload disk spring 30 have increased contact surfaces between them; and (2) by engaging the first retainers 215 and the second retainers 315 with the second notches 316 and the first notches 216, respectively, and by forming a one-to-one correspondence of the first extended elements 22 with the second extended elements 32, the preloads of the first and the second preload disk spring 20, 30 can be uniformly distributed in an axial direction of the preload disk spring assembly structure SA.

The preload disk spring assembly structure SA of the present invention can be applied to a fan 40.

Figure 3A:
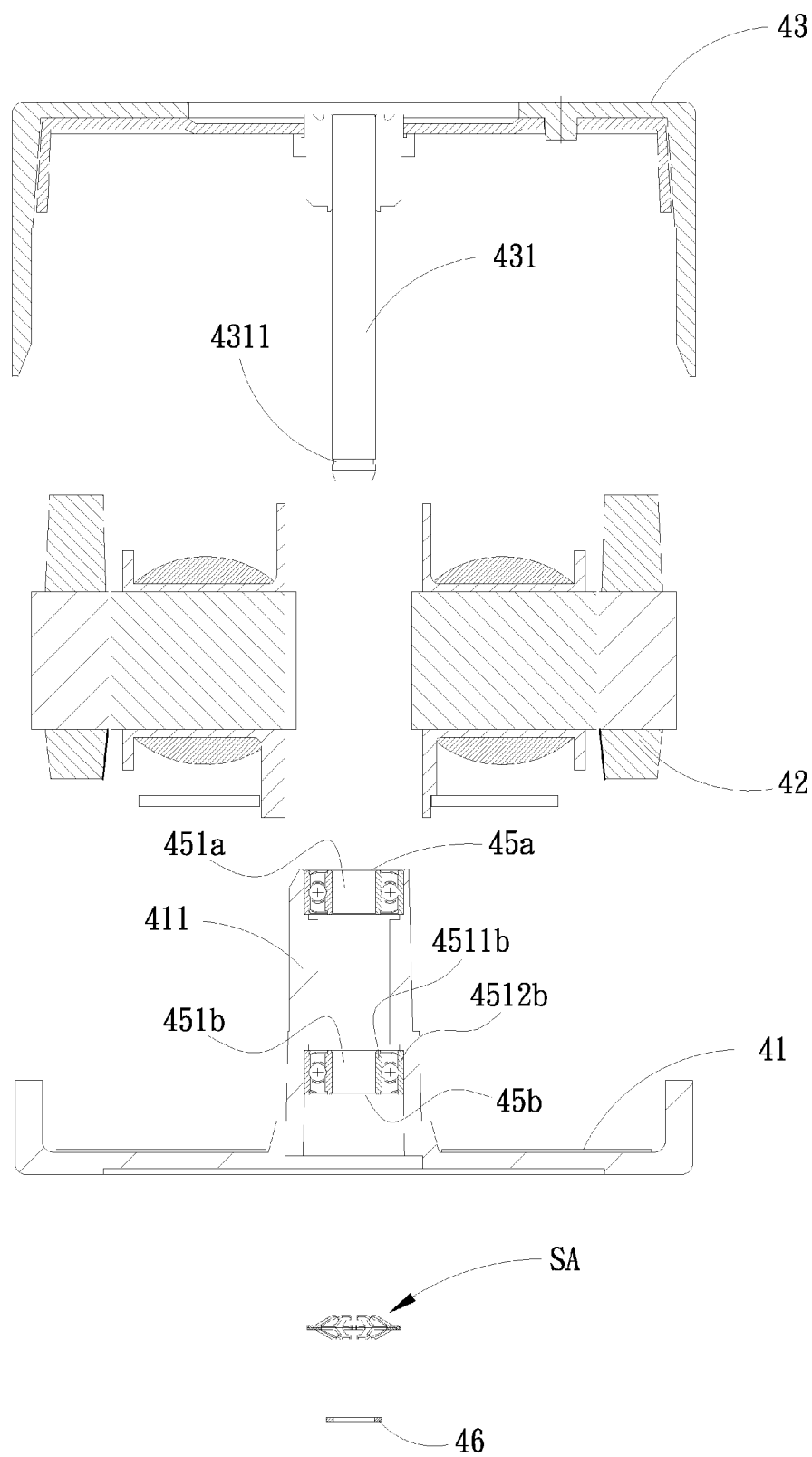
FIG. 3A is an exploded sectional side view of a fan using the preload disk spring assembly structure of the present invention.
Figure 3B:
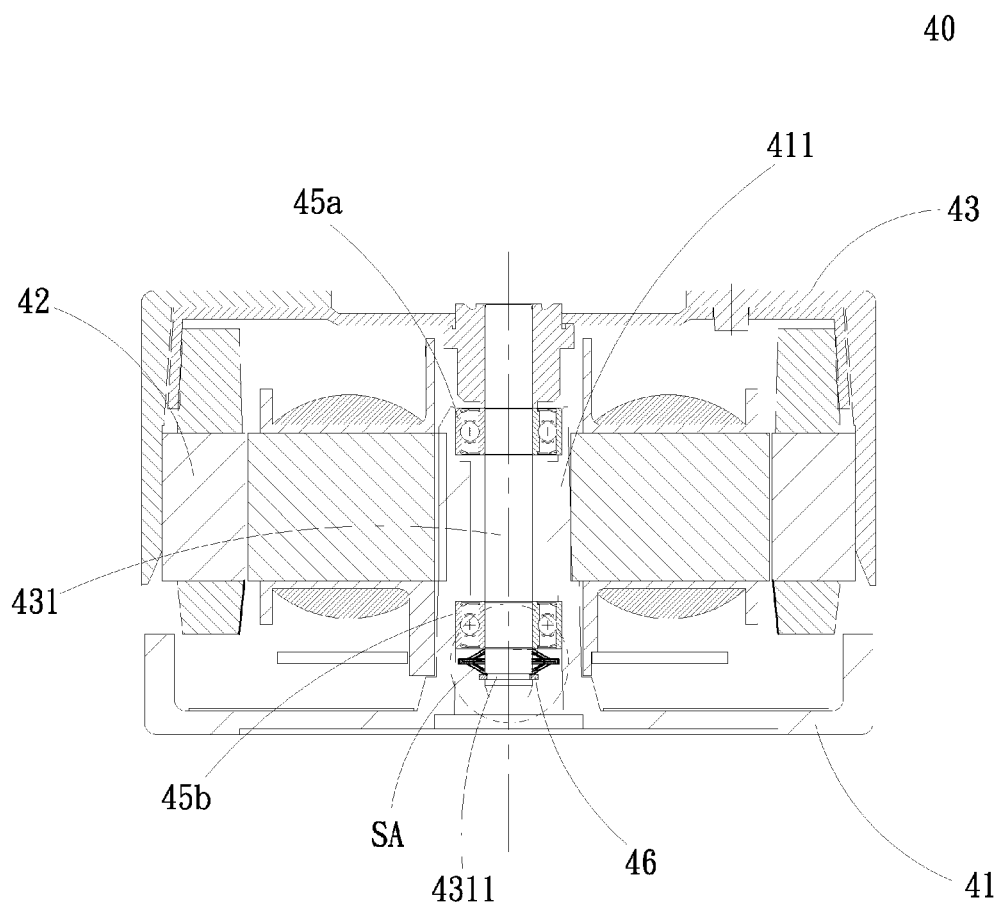
FIG. 3B is an assembled view of FIG. 3A.
Figure 3C:
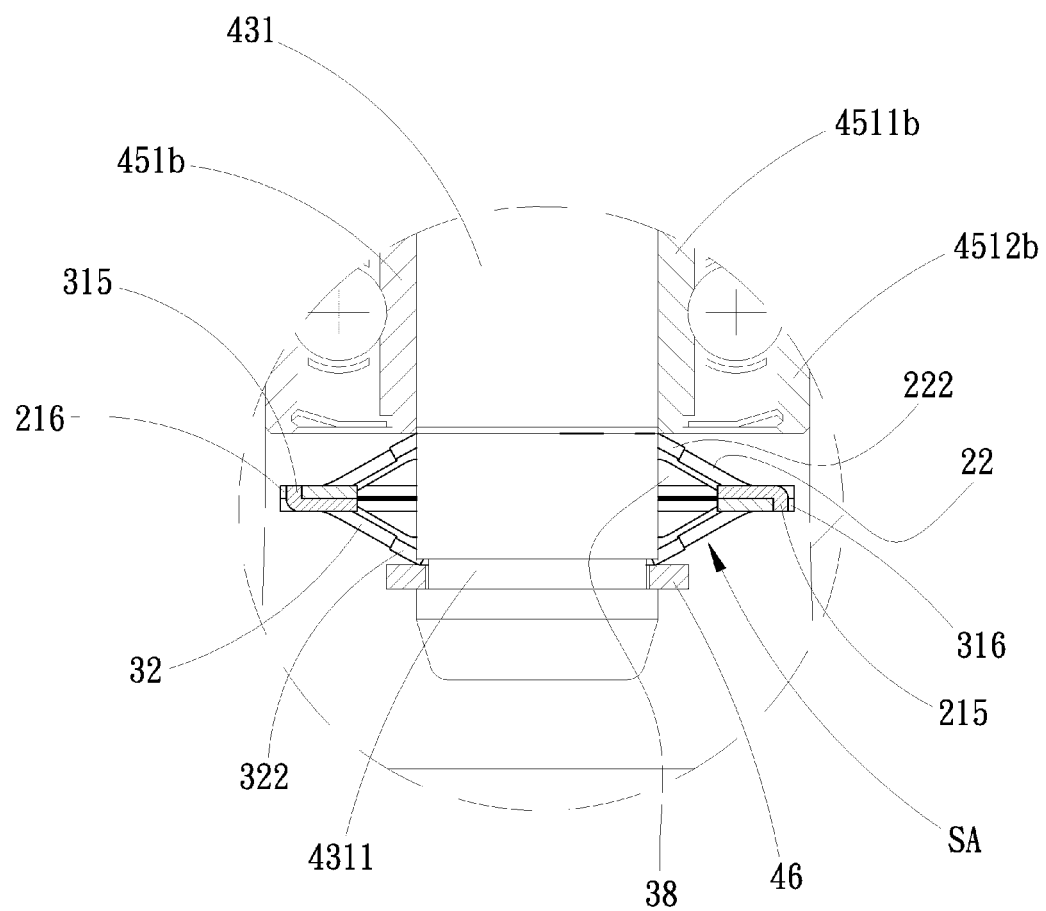
FIG. 3C is an enlarged view of the circled area of FIG. 3B.

Please refer to FIGS. 3A and 3B, which are exploded and assembled sectional views, respectively, of a fan 40 using the preload disk spring assembly structure SA according to the present invention, and to FIG. 3C that is an enlarged view of the circled area of FIG. 3B. As shown, the fan 40 includes a base 41, a stator assembly 42, a rotor 43, and a preload disk spring assembly structure SA described with reference to FIGS. 2A to 2D.

The base 41 is arranged at a central position of a fan frame (not shown), and includes a bearing cup 411 axially forward projected from the base 41 for receiving at least one bearing therein. In the illustrated embodiment of the fan 40, two bearings 45a, 45b are fitted in the bearing cup 411 near a top end and a bottom end thereof, respectively. The bearings 45a, 45b respectively have a shaft hole 451a, 451b. It is understood the number of the bearings is not necessarily limited to two. Further, the bearings 45a, 45b can be, but not limited to, ball bearings.

The stator assembly 42 is externally fitted around the bearing cup 411, and includes a plurality of silicon steel plates, an insulated frame, a plurality of windings, a circuit board and the like.

The rotor 43 is configured corresponding to the stator assembly 42, and includes a shaft 431 extended through the bearings 45a, 45b via the shaft holes 451a, 451b. An end of the shaft 431 extended through the bearings 45a, 45b is provided with an annular retaining groove 4311.

Please refer to FIGS. 3A to 3C along with FIGS. 2A to 2D. The shaft 431 extended through the bearings further extends through the preload disk spring assembly structure SA via the first opening 211 of the first main body 21 and the second opening 311 of the second main body 31, and the annular retaining groove 4311 is located behind the bearing 45b to engage with a retaining element 46. The retaining element 46 can be, but not limited to, a retaining ring.

Therefore, the first main body 21 and the second main body 31 of the preload disk spring assembly SA are fitted around the shaft 431 to locate between the bearing 45b and the retaining element 46. With the preload disk spring assembly structure SA located at this position, the first extended elements 22 are pressed against the bearing 45b while the second extended elements 32 are pressed against the retaining element 46.

As can be seen in FIGS. 2A to 2D and 3C, the bearing 45b includes an inner annular wall portion 4511b and an outer annular wall portion 4512b. The first heads 222 of the first extended elements 22 are pressed against the inner annular wall portion 4511b, while the second heads 322 of the second extended elements 32 are pressed against the retaining element 46. With these arrangements, the preload disk spring assembly structure SA can axially apply a preload to the bearing 45b to prevent the latter from vibrating and accordingly reduce the noise produced by the bearing 45b.

The first extended elements 22 and the second extended elements 32 will be compressed and shifted toward the buffer space 38 when they are subjected to an axial vibration of the bearing 45b, and will then return to original positions due to their elastic restoring force when the axial vibration of the bearing 45b is removed.

In conclusion, when the preload disk spring assembly structure of the present invention is applied to a fan, the following advantages can be obtained:

(1) With the increased contact surfaces between the first and the second preload disk spring and with the one-to-one correspondence of the first extended elements with the second extended elements, it is ensured the preload of the preload disk spring assembly structure is uniformly axially distributed and the bearing is evenly subjected to the preload;

(2) The two preload disk springs forming the preload disk spring assembly structure are connected together to form an integral body, which eliminates the problem of biased preload disk springs after being assembled to a fan shaft and is not easily stuck to the annular retaining groove on the shaft; and (3) The two preload disk springs forming the preload disk spring assembly structure are connected together to form an integral body, making it easier to determine whether the preload disk spring assembly structure has been correctly located after it is assembled to the shaft.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A preload disk spring, comprising:
   a main body having a radially inner side defining an opening axially extended through the main body, a radially outer side, a first contact surface defined between the inner side and the outer side, at least one retainer projected from the first contact surface, and at least one notch located offset from the at least one retainer;
   a plurality of extended elements being formed on the inner side of the main body to radially extend toward a center of the opening;
   at least one protruded portion being formed on and radially projected from the inner side of the main body toward the center of the opening, and having a second contact surface; and
   wherein the notch is formed on the outer side of the main body and is radially recessed from the outer side.

2. The preload disk spring as claimed in claim 1, wherein the retainer is formed on or near the outer side of the main body.

3. The preload disk spring as claimed in claim 2, wherein the retainer can be located on the outer side of the main body corresponding to or without corresponding to the protruded portion.

4. The preload disk spring as claimed in claim 1, wherein the notch can be located on the outer side of the main body corresponding to or without corresponding to the protruded portion.

5. The preload disk spring as claimed in claim 1, wherein the protruded portion has a length shorter than that of the extended elements.

6. The preload disk spring as claimed in claim 1, wherein each of the extended elements includes a root formed on the inner side of the main body and a head formed on a distal end of the root and having an end surface.

7. The preload disk spring as claimed in claim 6, wherein the roots of the extended elements are bent in a direction averted from the first contact surface, so that an angle is included between the main body and each of the extended elements.

8. The preload disk spring as claimed in claim 7, wherein the angle included between the main body and each of the extended elements is larger than 90°.

9. A preload disk spring assembly structure, comprising:
a first main body having a radially first inner side defining a first opening axially extended through the first main body, a radially first outer side, a first contact surface defined between the first inner side and the first outer side, at least one first retainer projected from the first contact surface, and at least one first notch located offset from the at least one first retainer;
a plurality of first extended elements being formed on the first inner side of the first main body to radially extend toward a center of the first opening;
at least one first protruded portion being formed on and radially projected from the first inner side of the first main body toward the center of the first opening, and having a second contact surface;
a second main body having a radially second inner side defining a second opening axially extended through the second main body, a radially second outer side, a third contact surface defined between the second inner side and the second outer side to correspondingly contact with the first contact surface, at least one second retainer projected from the third contact surface to tightly engage with the at least one first notch, and at least one second notch located offset from the at least one second retainer to tightly engage with the at least one first retainer;
a plurality of second extended elements being formed on the second inner side of the second main body to radially extend toward a center of the second opening, and the second extended elements being in a one-to-one correspondence with the first extended elements; and
at least one second protruded portion being formed on and radially projected from the second inner side of the second main body toward the center of the second opening, and having a fourth contact surface to correspondingly contact with the second contact surface; whereby the first main body and the second main body are assembled together to form an integral body.

10. The preload disk spring assembly structure as claimed in claim 9, wherein the first retainer is formed on or near the first outer side of the first main body, and the second retainer is formed on or near the second outer side of the second main body.

11. The preload disk spring assembly structure as claimed in claim 10, wherein the first retainer and the second retainer can be located corresponding to or without corresponding to the first and the second protruded portion, respectively.

12. The preload disk spring assembly structure as claimed in claim 9, wherein the first notch is formed on the first outer side of the first main body and is radially recessed from the first outer side; and the second notch is formed on the second outer side of the second main body and is radially recessed from the second outer side.

13. The preload disk spring assembly structure as claimed in claim 12, wherein the first and the second notch can be located corresponding to or without corresponding to the first and the second protruded portion, respectively; and wherein the first protruded portion has a length shorter than that of the first extended elements; and the second protruded portion has a length shorter than that of the second extended elements.

14. The preload disk spring assembly structure as claimed in claim 9, wherein each of the first extended elements includes a first root formed on the first inner side of the first main body and a first head formed on a distal end of the first root and having a first end surface; and wherein each of the second extended elements includes a second root formed on the second inner side of the second main body and a second head formed on a distal end of the second root and having a second end surface.

15. The preload disk spring assembly structure as claimed in claim 14, wherein the first roots of the first extended elements are bent in a direction averted from the first contact surface, so that a first angle is included between the first main body and each of the first extended elements; and wherein the second roots of the second extended elements are bent in a direction averted from the third contact surface, so that a second angle is included between the second main body and each of the second extended elements.

16. The preload disk spring assembly structure as claimed in claim 15, wherein the first angle included between the first main body and each of the first extended elements as well as the second angle included between the second main body and each of the second extended elements are larger than 90°.

17. A fan, comprising:
a base having a bearing cup axially forward projected therefrom for receiving at least one bearing therein, and the bearing each having a shaft hole;
a stator assembly being externally fitted around the bearing cup;
a rotor being configured corresponding to the stator assembly and having a shaft extended through the bearing via the shaft hole thereof; and the shaft being provided with an annular retaining groove for engaging with a retaining element; and
a preload disk spring assembly structure being fitted around the shaft of the rotor to locate between the bearing and the retaining element, and including:
a first main body having a radially first inner side defining a first opening axially extended through the first main body, a radially first outer side, a first contact surface defined between the first inner side and the first outer side, at least one first retainer projected from the first contact surface, and at least one first notch located offset from the at least one first retainer;
a plurality of first extended elements being formed on the first inner side of the first main body to radially extend toward a center of the first opening;
at least one first protruded portion being formed on and radially projected from the first inner side of the first main body toward the center of the first opening, and having a second contact surface;
a second main body having a radially second inner side defining a second opening axially extended through the second main body, a radially second outer side, a third contact surface defined between the second inner side and the second outer side to correspondingly contact with the first contact surface, at least one second retainer projected from the third contact surface to tightly engage with the at least one first notch, and at least one second notch located offset from the at least one second retainer to tightly engage with the at least one first retainer;

a plurality of second extended elements being formed on the second inner side of the second main body to radially extend toward a center of the second opening, and the second extended elements being in a one-to-one correspondence with the first extended elements; and at least one second protruded portion being formed on and radially projected from the second inner side of the second main body toward the center of the second opening, and having a fourth contact surface to correspondingly contact with the second contact surface; whereby the first main body and the second main body are assembled together to form an integral body;

wherein the shaft is extended through the first and the second opening, so that the first and the second main body are fitted around the shaft with the first extended elements contacted with and pressed against the bearing and the second extended elements contacted with and pressed against the retaining element.

18. The fan as claimed in claim 17, wherein each of the first extended elements includes a first root formed on the first inner side of the first main body and a first head formed on a distal end of the first root and having a first end surface; and wherein each of the second extended elements includes a second root formed on the second inner side of the second main body and a second head formed on a distal end of the second root and having a second end surface.

19. The fan as claimed in claim 18, wherein the bearing has an inner annular wall portion and an outer annular wall portion; the first heads of the first extended elements being pressed against the inner annular wall portion while the second heads of the second extended elements being pressed against the retaining element; and wherein the first extended elements and the second extended elements together define a buffer space between them.

* * * * *